United States Patent
Yang et al.

(10) Patent No.: US 6,456,507 B1
(45) Date of Patent: Sep. 24, 2002

(54) STRUCTURE OF UNINTERRUPTED POWER SUPPLY

(75) Inventors: Yung-Hung Yang; Tung-Hung Hsieh, both of Taoyuan Shien (TW)

(73) Assignee: Delta Electronics, Inc., Taoyuan Shien (TW)

( * ) Notice: Subject to any disclaimer, the term of this patent is extended or adjusted under 35 U.S.C. 154(b) by 0 days.

(21) Appl. No.: 09/804,629

(22) Filed: Mar. 9, 2001

(51) Int. Cl.[7] .................................................. H02B 1/01
(52) U.S. Cl. ........................ 361/829; 361/824; 361/827
(58) Field of Search ................................ 361/724–731, 361/824–829; 381/86; 455/346–348

(56) References Cited

U.S. PATENT DOCUMENTS 2,866,891 A  * 12/1958  Princ ............................ 250/14
5,864,627 A  *  1/1999  Kim ............................. 381/86

* cited by examiner

Primary Examiner—Kamand Cuneo
Assistant Examiner—Tuan Dinh
(74) Attorney, Agent, or Firm—Steinberg & Raskin, P.C.

(57) ABSTRACT

A structure of the uninterrupted power supply includes a lower housing, a first terminal pedestal, a second terminal pedestal and an upper housing. The lower housing has a battery receptacle, a circuit portion and a partitioning plate thereon, wherein the partitioning plate is disposed between the battery receptacle and the circuit portion and has a first cavity and a second cavity. The first terminal pedestal and the second terminal pedestal are carried on the first cavity and the second cavity respectively. The battery has two recesses for containing the positive electrode and the negative electrode thereof. The battery is capable of being positioned into the battery receptacle and electrically with the first terminal and the second terminal after the lower housing and the upper housing are assembled.

8 Claims, 3 Drawing Sheets

STRUCTURE OF UNINTERRUPTED POWER SUPPLY

FIELD OF THE INVENTION

The present invention relates to an uninterrupted power supply, and more particularly, to an uninterrupted power supply having a structure for easily drawing out/positioning a battery from/into a battery receptacle.

BACKGROUND OF THE INVENTION

An uninterrupted power supply (UPS) is widely used to provide a stable power supply to a load such as a computer. If the voltage of the commercial AC power supply is subject to a sudden variation or interruption, the power to the load could be maintained at an applicable level by using the UPS. A typical UPS essentially includes a battery charger, a controller, an inverter, a converter, etc., wherein the most important component is the battery. The backup battery is activated to provide power to the load when the commercial power is in the case of significant degradation.

Please refer to FIG. 1. The structure of a customarily used UPS includes a lower housing 1 and an upper housing 2. The lower housing 1 has a circuit portion 11 and a battery receptacle 12. The circuit portion 11 includes a circuit board (not shown) having electronic devices thereon, wherein the electronic devices includes a controller, an inverter and a converter, etc. The receptacle portion 12 is used for receiving a battery 15. One end of each of the conducting wires 13 and 14, i.e. 131 and 141, is soldered to the circuit board. And the other ends, i.e. 132 and 142, are formed into clipper sheets for clipping the positive electrode 151 and negative electrode 152 of the battery 15. Once the upper housing 2 is engaged with the lower housing 1, the assembly of such UPS is performed.

The structure of the conventional UPS shown in FIG. 1 faces to the problem of drawing out/positioning the battery 15 from/into the battery receptacle 12 with difficulty. Especially when the UPS is employed in the workplace with high humidity, sour vapor and dust, the battery 15 is required to be maintained for checking whether the battery liquid leaks out or the electrode of the battery becomes rusty. Moreover, the battery needs to be replaced with a new one if the capacity thereof reduces too much. Generally, the typical battery has a life of about 2 years and the typical UPS has a life of about 10 years. Thus, it is estimated that the number of times for drawing out/positioning a battery from/into the UPS is about 5 to 20. In order to draw out the battery 15, the battery 15 is first drawn out from the battery receptacle 12 of the UPS, and then the clipper sheets 132 and 142 are detached from the electrodes 151 and 152 of the battery 15. There are usually two possible methods for positioning the battery 15. The first method includes steps of detaching the upper housing 2 from the lower housing 1, connecting the electrodes 151 and 152 of the battery 15 with the conducting wires 13 and 14, positioning the battery 15 into the battery receptacle and covering the upper housing 2. The first method is very inconvenient because the upper housing 2 needs to be detached. The second method includes steps of connecting the electrodes 151 and 152 of the battery 15 with the conducting wires 13 and 14 without detaching the upper housing 2, and then positioning the battery 15 into the battery receptacle. Apparently, the second method is difficult to perform and time-consuming because the space for connecting the electrodes 151 and 152 of the battery 15 with the conducting wires 13 and 14 is very narrow.

Therefore, the present invention provides an improved structure of an uninterrupted power supply for overcoming the problems described above.

SUMMARY OF THE INVENTION

It is the first object of the present invention to provide a structure of an uninterrupted power for easily drawing out/positioning the battery from/into the battery receptacle.

It is the first object of the present invention to provide a structure of an uninterrupted power supply for drawing out/positioning the battery without detaching the upper housing from the lower housing.

According to the present invention, there is provided a structure of the uninterrupted power supply includes a lower housing, a first terminal pedestal, a second terminal pedestal and an upper housing. The lower housing has a battery receptacle, a circuit portion and a partitioning plate thereon, wherein the partitioning plate is disposed between the battery receptacle and the circuit portion and has a first cavity and a second cavity. The first terminal pedestal is carried on the first cavity and mounted with a first terminal, and the first terminal is electrically connected with the circuit portion. The second terminal pedestal is carried on the second cavity and mounted with a second terminal, and the second terminal is electrically connected with the circuit portion. The battery has two recesses for containing the positive electrode and the negative electrode thereof. The battery is capable of being positioned into the battery receptacle and electrically with the first terminal and the second terminal after the lower housing and the upper housing are assembled.

Certainly, each of the lower housing, the upper housing, the partitioning plate, the first terminal pedestal and the second pedestal can be made of insulated material.

Preferably, the partitioning plate includes a first positioning pedestal corresponding to the first cavity and a second positioning pedestal corresponding to the second cavity for supporting the first terminal pedestal and the second pedestal respectively.

Preferably, the first positioning pedestal, the second positioning pedestal and the partitioning plate are integrally formed with the lower housing.

Preferably, the first terminal pedestal and the second pedestal are integrally formed with the partitioning plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENTS

Figure 1:
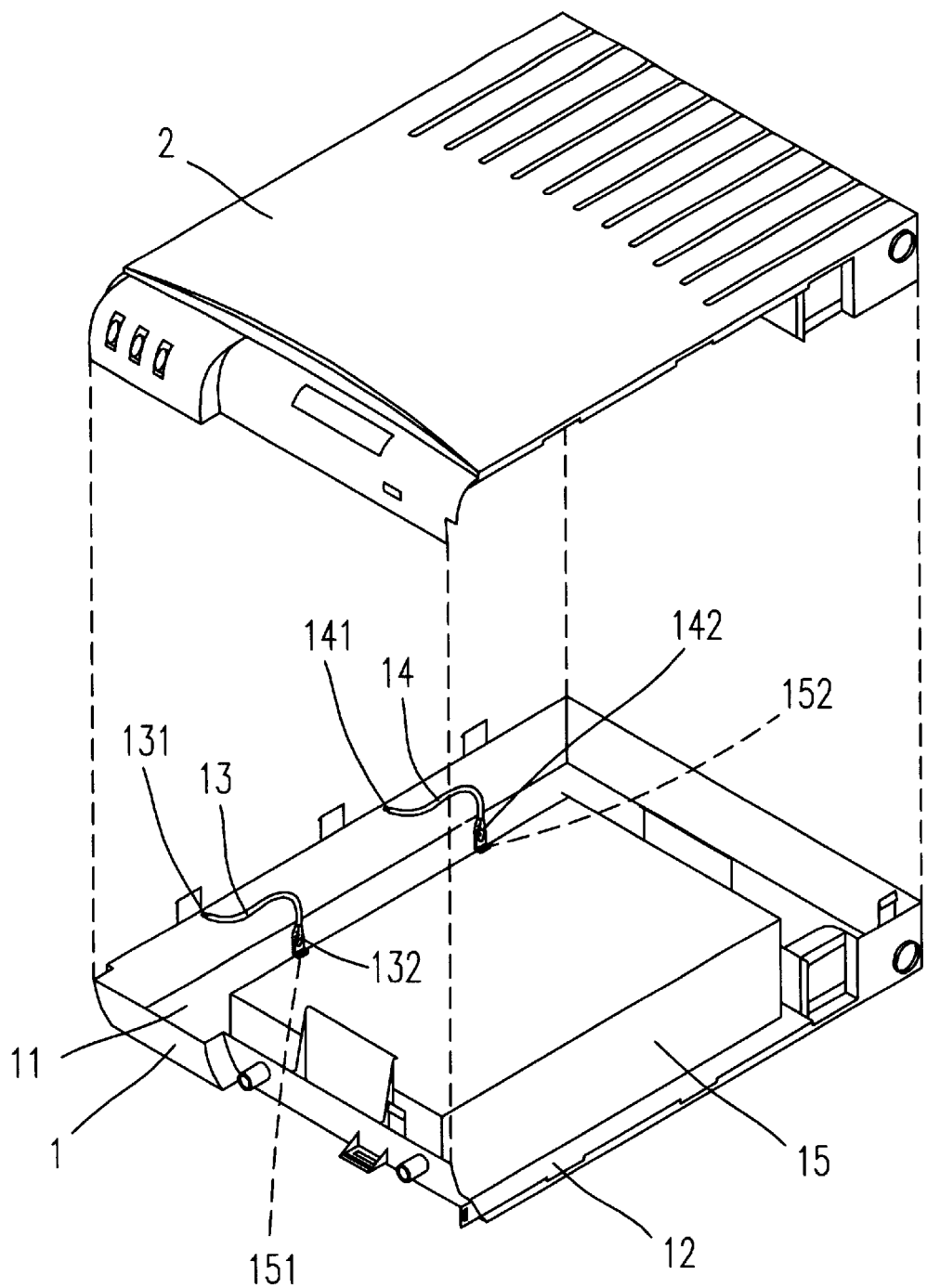
FIG. 1 is a schematic view illustrating the structure of an uninterrupted power supply according to prior art.
Figure 2A:
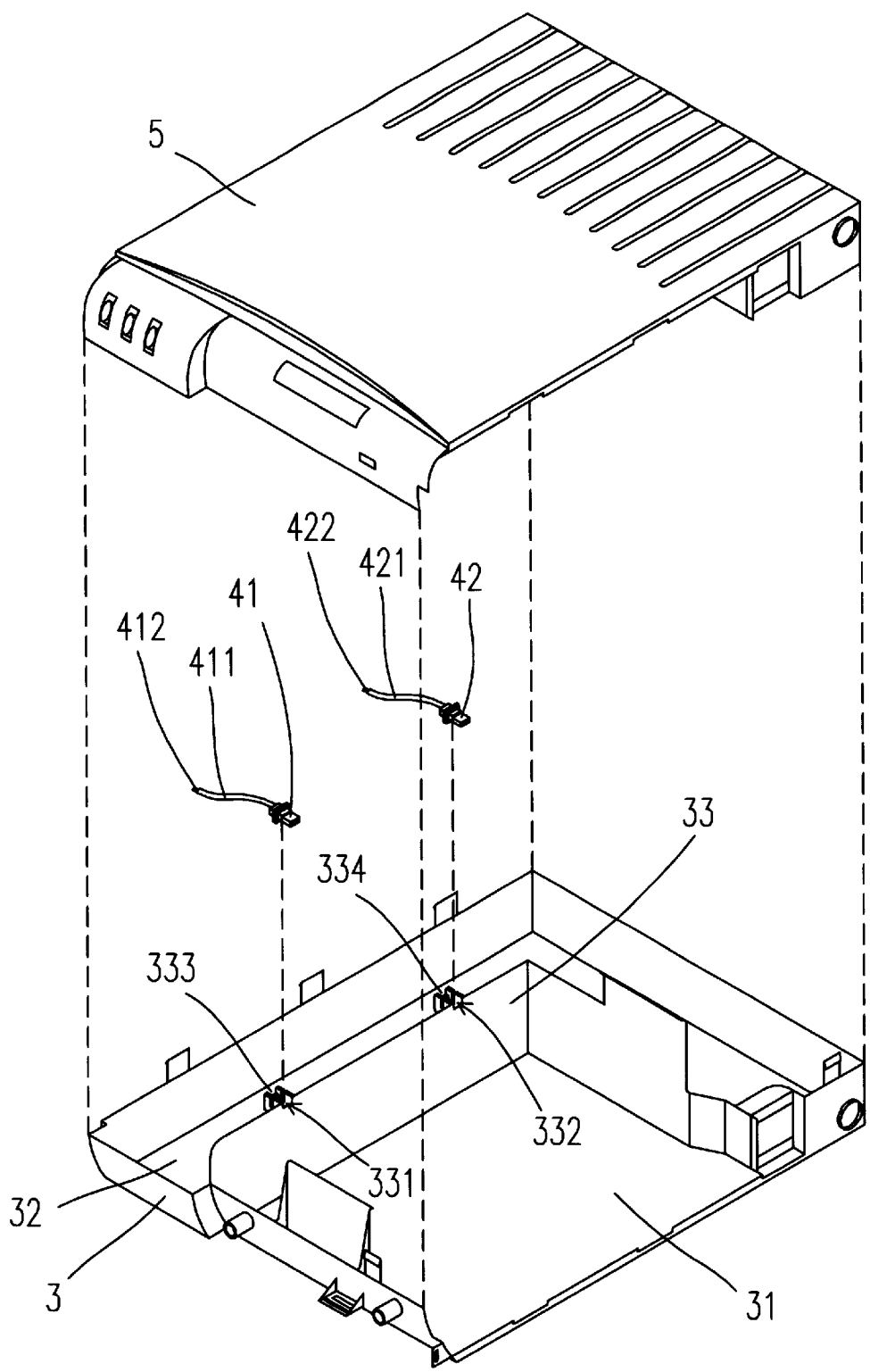
FIG. 2(a) is a view illustrating the assembly of the UPS structure according to the preferred embodiment of the present invention.
Figure 2B:
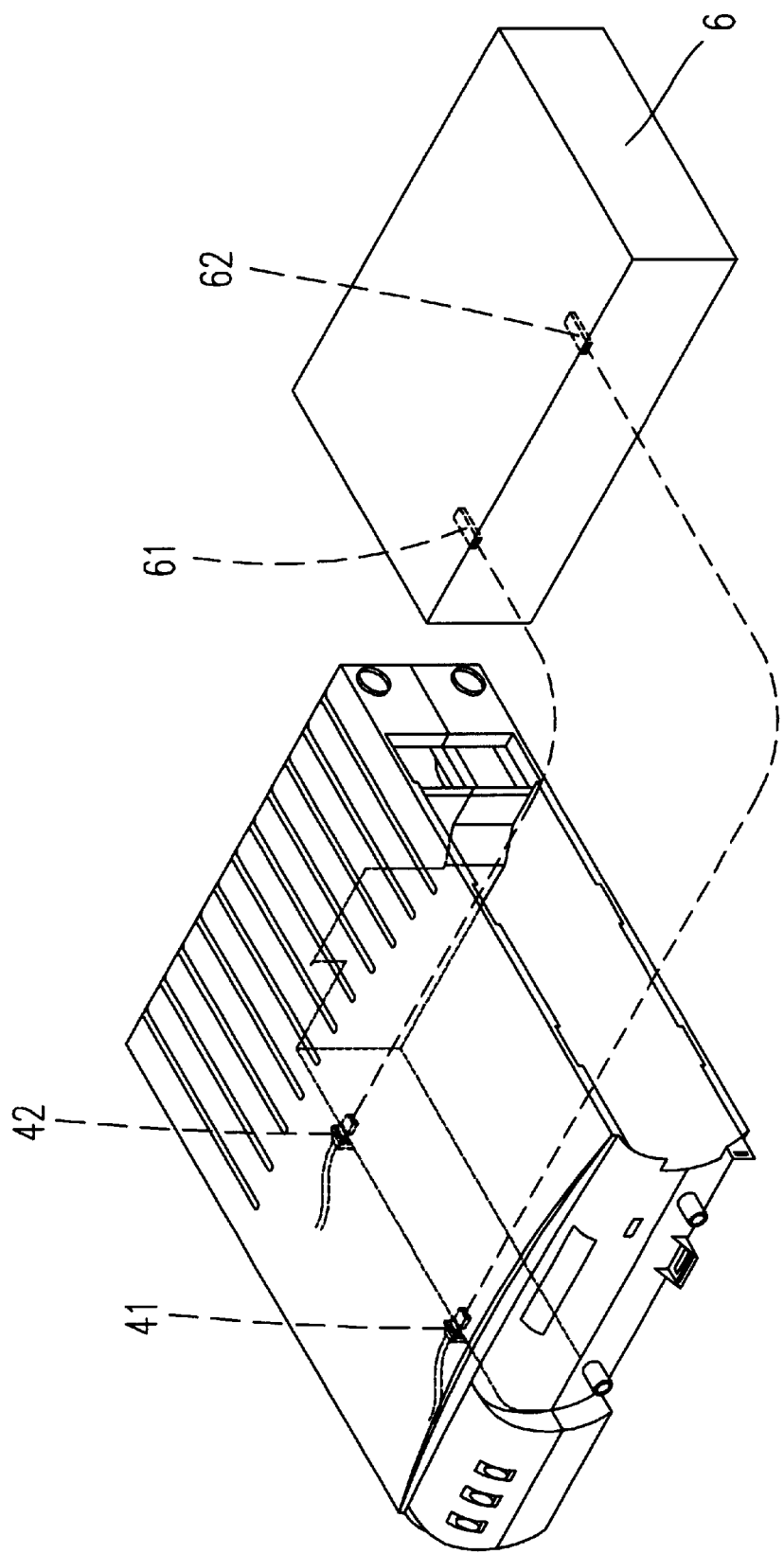
FIG. 2(b) is a schematic view illustrating the connection of the battery electrode and the first terminal and the second terminal according to the preferred embodiment of the present invention.

FIG. 2(a) is a view showing the assembly of the UPS structure according to a preferred embodiment of the present invention. The UPS structure includes a lower housing 3, a first terminal pedestal 41, a second terminal pedestal 42 and an upper housing 5, which are made of insulated material. The lower housing 3 has a battery receptacle 31 for accepting a battery 6, a circuit portion 32 for accepting a circuit board (not shown), and a partitioning plate 33 thereon. The circuit board is equipped with the typical electronic devices used in UPS, such as controller, inverter and converter, which are skilled in the art. The partitioning plate 33 is disposed between the battery receptacle 31 and the circuit portion 32 and has a first cavity 331 and a second cavity 332 thereon. The partitioning plate 33 further includes a first positioning pedestal 333 corresponding to the first cavity 331 and a second positioning pedestal 334 corresponding to the second cavity 332 for supporting the first terminal pedestal 41 and the second pedestal 42 respectively. Preferably, the first positioning pedestal 333, the second positioning pedestal 334 and the partitioning plate 33 are integrally formed with the lower housing 3. The first terminal pedestal 41 is carried on the first cavity 331 and mounted with a first terminal (not shown), and the first terminal is electrically connected with the circuit board on the circuit portion 32 via a first conducting wire 412. The second terminal pedestal 42 is carried on the second cavity 332 and mounted with a second terminal (not shown), and the second terminal is electrically connected with the circuit board of the circuit portion 32. Please refer to FIG. 2(b), the battery 6 has two recesses 61 and 62 for containing the positive electrode 63 and the negative electrode 64 thereof. After the lower housing 3 and the upper housing 5 are assembled, the battery 6 is capable of being positioned into the battery receptacle 31 and electrically with the first terminal and the second terminal.

Preferably, the first terminal pedestal 41 and the second pedestal 42 are integrally formed with the partitioning plate 31 so as to reduce the cost and assembling time of the UPS structure according to the present invention.

As will be apparent from the above description according to the present invention, the structure of the uninterrupted power supply has the advantages of more easily drawing out/positioning the battery from/into the battery receptacle and less assembling time, because the battery is capable of being positioned into the battery receptacle and electrically with the first terminal and the second terminal after the lower housing and the upper housing are assembled and the movement of drawing out/positioning the battery into the battery receptacle would be implemented without detaching the upper housing.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A structure of an uninterrupted power supply, comprising:
    a lower housing having a battery receptacle, a circuit portion and a partitioning plate thereon, said partitioning plate being disposed between said battery receptacle and said circuit portion and having a first cavity and a second cavity;
    a first terminal pedestal carried on said first cavity and mounting a first terminal, said first terminal being electrically connected with said circuit portion;
    a second terminal pedestal carried on said second cavity and mounting a second terminal, said second terminal being electrically connected with said circuit portion;
    a battery having two recesses for containing the positive electrode and the negative electrode thereof; and
    an upper housing,
    wherein said battery is capable of being positioned into said battery receptacle and electrically with said first terminal and said second terminal after said lower housing and said upper housing are assembled, and said partitioning plate comprises a first positioning pedestal corresponding to said first cavity and a second positioning pedestal corresponding to said second cavity for supporting said first terminal pedestal and said second pedestal respectively.

2. The structure according to claim 1, wherein each of said lower housing, said upper housing, said partitioning plate, said first terminal pedestal and said second pedestal is made of insulated material.

3. The structure according to claim 1, wherein said first positioning pedestal, said second positioning pedestal and said partitioning plate are integrally formed with said lower housing.

4. The structure according to claim 1, wherein said first terminal pedestal and said second pedestal are integrally formed with said partitioning plate.

5. A structure of an uninterrupted power supply, comprising:
    a lower housing having a battery receptacle, a circuit portion and a partitioning plate thereon, said partitioning plate being disposed between said battery receptacle and said circuit portion and having a first cavity, a second cavity, a first positioning pedestal corresponding to said first cavity and a second positioning pedestal corresponding to said second cavity;
    a first terminal pedestal carried on said first cavity and mounting a first terminal, said first terminal being electrically connected with said circuit portion;
    a second terminal pedestal carried on said, second cavity and mounting a second terminal, said second terminal being electrically connected with said circuit portion;
    a battery having two recesses for containing the positive electrode and the negative electrode thereof; and
    an upper housing,
    wherein said battery is capable of being positioned into said battery receptacle and electrically coupled with said first terminal and said second terminal after said lower housing and said upper housing are assembled.

6. The structure according to claim 5, wherein each of said lower housing, said upper housing, said partitioning plate, said first terminal pedestal and said second pedestal is made of insulated material.

7. The structure according to claim 5, wherein said first positioning pedestal, said second positioning pedestal, and said partitioning plate are integrally formed with said lower housing.

8. The structure according to claim 5, wherein said first terminal pedestal and said second pedestal are integrally formed with said partitioning plate.

* * * * *